US012140283B2

(12) United States Patent
Shimizu et al.

(10) Patent No.: US 12,140,283 B2
(45) Date of Patent: Nov. 12, 2024

(54) LENS STRUCTURE FOR VEHICLE LAMP

(71) Applicant: HONDA MOTOR CO., LTD., Tokyo (JP)

(72) Inventors: Go Shimizu, Tokyo (JP); Shunsuke Iwao, Tokyo (JP); Keisuke Kunori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/520,564

(22) Filed: Nov. 28, 2023

(65) Prior Publication Data

US 2024/0183505 A1 Jun. 6, 2024

(30) Foreign Application Priority Data

Dec. 2, 2022 (CN) ........................ 202211540674.1

(51) Int. Cl.
*F21S 41/24* (2018.01)
*F21V 5/04* (2006.01)

(52) U.S. Cl.
CPC ................ *F21S 41/24* (2018.01); *F21V 5/04* (2013.01)

(58) Field of Classification Search
CPC ........ F21S 41/24; F21S 41/322; F21S 43/235; F21S 43/236; F21S 43/239; F21S 43/315; F21S 41/148; F21V 5/04; F21V 7/0091
See application file for complete search history.

(56) References Cited

U.S. PATENT DOCUMENTS

| | | | | |
|---|---|---|---|---|
| 2010/0226143 | A1* | 9/2010 | Cheung | F21S 41/322 362/516 |
| 2012/0294030 | A1* | 11/2012 | Okada | F21S 43/31 362/602 |
| 2015/0367773 | A1* | 12/2015 | Matsumaru | F21S 43/31 362/516 |
| 2018/0356582 | A1* | 12/2018 | Sousek | F21S 43/243 |
| 2019/0078745 | A1* | 3/2019 | Gloss | F21S 41/151 |
| 2024/0109473 | A1* | 4/2024 | Katsurada | F21S 43/15 |

FOREIGN PATENT DOCUMENTS

| | | | | |
|---|---|---|---|---|
| EP | 2479486 A2 * | 7/2012 | | F21S 41/141 |
| JP | 2018013680 A * | 1/2018 | | |
| JP | 2018014279 A | 1/2018 | | |
| WO | WO-2021136235 A1 * | 7/2021 | | B60Q 1/2607 |
| WO | WO-2021147734 A1 * | 7/2021 | | B60Q 1/04 |

* cited by examiner

*Primary Examiner* — Erin Kryukova
(74) *Attorney, Agent, or Firm* — CKC & Partners Co., LLC

(57) ABSTRACT

To allow light from one or one group of light sources to be used for a plurality of applications. A lens structure for a vehicle lamp includes a light transmitter and a reflective surface. The light transmitter is configured to transmit light in a predetermined horizontal direction. The reflective surface is provided at an upper portion of an end portion of the light transmitter in the predetermined horizontal direction. A direction perpendicular to the reflective surface is inclined toward a direction opposite to the predetermined horizontal direction from a direction directly downward. The reflective surface totally reflects the light travelling in the predetermined horizontal direction downward. The light transmitted from below the reflective surface in the light transmitter in the predetermined horizontal direction radiates in the predetermined horizontal direction, and the light reflected by the reflective surface illuminates a road surface.

3 Claims, 12 Drawing Sheets

LENS STRUCTURE FOR VEHICLE LAMP

This application is based on and claims the benefit of priority from Chinese Patent Application CN202211540674.1, filed on 2 Dec. 2022, the content of which is incorporated herein by reference.

BACKGROUND OF THE INVENTION

Field of the Invention

The present invention relates to a lens structure for a vehicle lamp.

Related Art

Some lens structures guide light emitted from a light source such as an LED to a desired direction by total reflection.

Patent Document 1: Japanese Unexamined Patent Application, Publication No. 2018-14279

SUMMARY OF THE INVENTION

The present inventors have noted that, with such a lens structure, for example, if light from one or one group of light sources can be used for a plurality of applications, it can contribute to downsizing and improvement in performance of vehicle lamp. In addition, the present inventors have noted the possibility of further improving traffic safety and contributing to the development of sustainable transportation systems by contributing to improved visibility during nighttime driving or the like.

The present invention has been made in view of the above circumstances, and an object of the present invention is to allow light from one or one group of light sources to be used for a plurality of applications.

The present inventors have found that light from one or one group of light sources can be used for a plurality of applications by providing a reflective surface on an upper portion of a light transmitter that transmits light in a predetermined horizontal direction, so that only an upper portion of the light travelling in the predetermined horizontal direction is totally reflected downward by the reflective surface, and have reached the present invention. The present invention provides lens structures for a vehicle lamp according to a first aspect to a third aspect below.

(1) The first aspect provides a lens structure for a vehicle lamp configured to emit light in a predetermined horizontal direction. The lens structure includes a light transmitter and a reflective surface. The light transmitter is configured to transmit the light in the predetermined horizontal direction. The reflective surface is provided at an upper portion of an end portion of the light transmitter in the predetermined horizontal direction and is configured to totally reflect the light travelling in the predetermined horizontal direction downward. A direction perpendicular to the reflective surface is inclined toward a direction opposite to the predetermined horizontal direction from a direction directly downward. The light transmitted from below the reflective surface in the light transmitter in the predetermined horizontal direction radiates in the predetermined horizontal direction. The light reflected by the reflective surface illuminates a road surface.

According to this configuration, a part of the light passing through the light transmitter can be used for horizontal radiation, and the other part thereof can be used for road surface illumination. Therefore, light from one or one group of light sources can be used for both the horizontal radiation and the road surface illumination. In addition, by collectively providing the part for horizontal radiation and the part for road surface illumination at the end portion of the light transmitter, a lens structure excellent in design and vehicle mountability can be provided.

(2) In a second aspect according to the first aspect, the lens structure further includes a light guide configured to guide light from a light source into the light transmitter as parallel light travelling in the predetermined horizontal direction. The light guide and the light transmitter are integrally formed.

According to this configuration, there is no concern about reflection or the like occurring between the light guide and the light transmitter. Therefore, parallel light can be smoothly guided from the light guide to the light transmitter.

(3) In a third aspect according to the first or second aspect, the direction perpendicular to the reflective surface is inclined at an angle of less than 45° toward the direction opposite to the predetermined horizontal direction from the direction directly downward.

According to this configuration, the parallel light travelling in the predetermined horizontal direction is not reflected directly downward by the reflective surface, but can be reflected toward the predetermined horizontal direction side rather than directly downward. Therefore, the reflected light can directly illuminate a position on the road surface separated from the own vehicle in the predetermined horizontal direction.

As described above, according to the present invention, light from one or one group of light sources can be used for a plurality of applications. Furthermore, according to the configurations of the second and third aspects that cite the first aspect, respective additional effects can be obtained.

DETAILED DESCRIPTION OF THE INVENTION

Hereinafter, embodiments of the present invention will be described with reference to the drawings. However, the present invention is not limited to the following embodiments, and can be modified as appropriate without departing from the gist of the present invention.

First Embodiment

Figure 11:
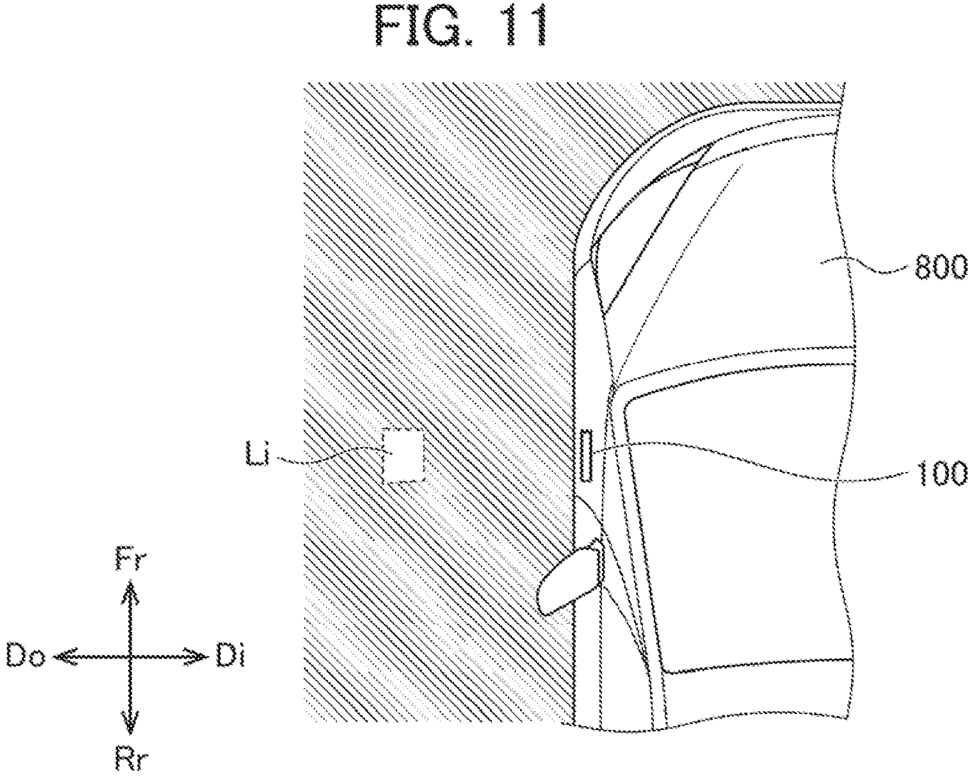
FIG. 11 is a plan view of an own vehicle and the lens structure as viewed from above.

As shown in FIG. 11, a lens structure 100 of the present embodiment is a part of a vehicle lamp that illuminates a side of a vehicle and a road surface, and is mounted on a left side surface or a right side surface of a front portion of the vehicle.

Hereinafter, the vehicle on which the lens structure 100 is mounted is referred to as "own vehicle 800", the front side of the own vehicle 800 in the vehicle length direction is referred to as "forward Fr", the rear side in the vehicle length direction is referred to as "rearward Rr", the inner side in the vehicle width direction is referred to as "inward Di", and the outer side in the vehicle width direction is referred to as "outward Do". That is, for example, as shown in FIG. 11, for the lens structure 100 mounted on the left side surface of the own vehicle 800, the outward Do is the left side and the inward Di is the right side. On the contrary, for the lens structure 100 mounted on the right side surface of the own vehicle 800, the outward Do is the right side and the inward Di is the left side. The "outward Do" may be read as "predetermined horizontal direction".

Figure 1:
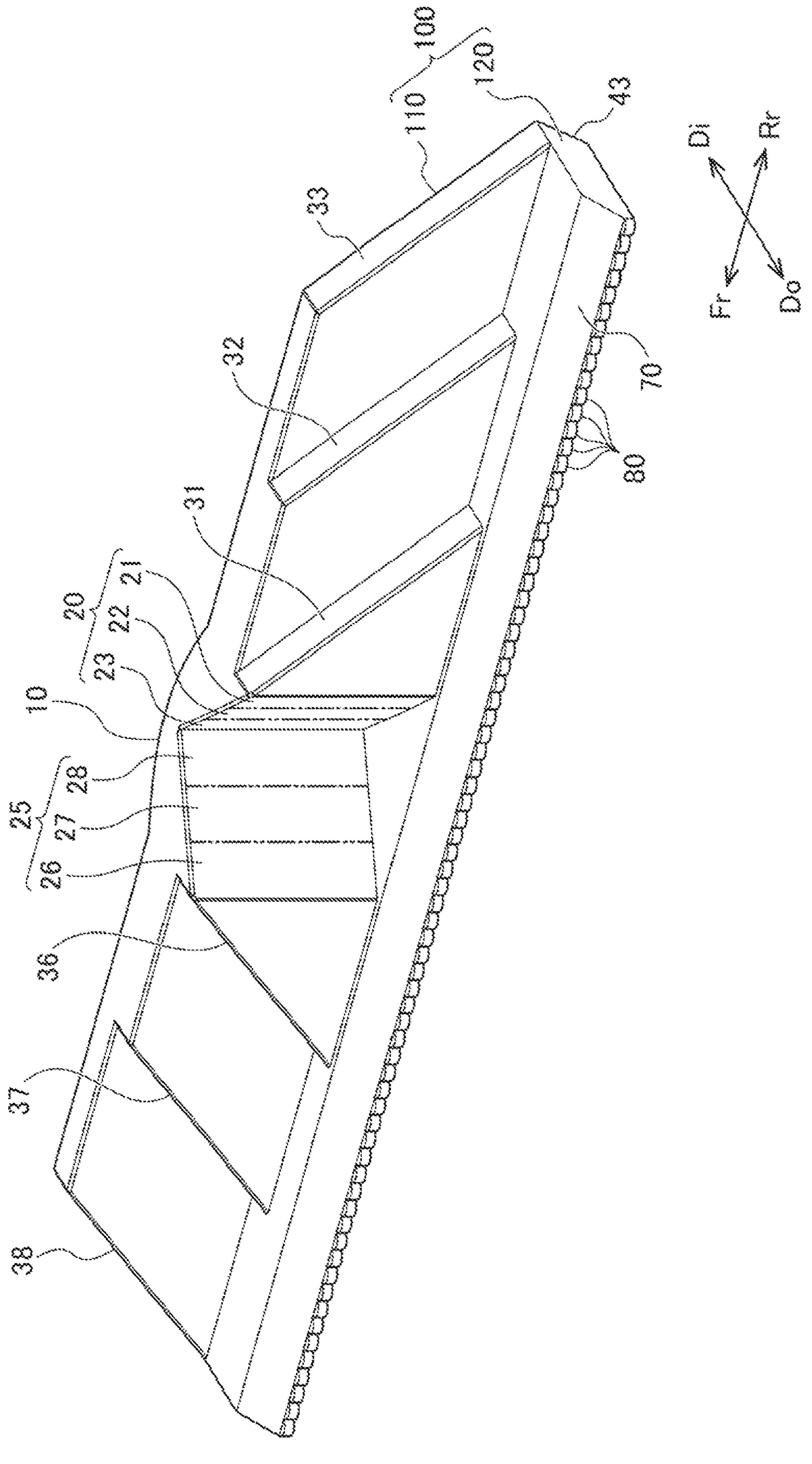
FIG. 1 is a perspective view of a lens structure according to a first embodiment as viewed from diagonally above on an outer side in a vehicle width direction.

As shown in FIG. 1, the lens structure 100 includes a light guide 110 extending in the vehicle length direction Fr, Rr and in the vertical direction, and a light transmitter 120 extending outward Do from a lower end portion of the light guide 110. The light guide 110 and the light transmitter 120 are integrally formed.

Figure 3:
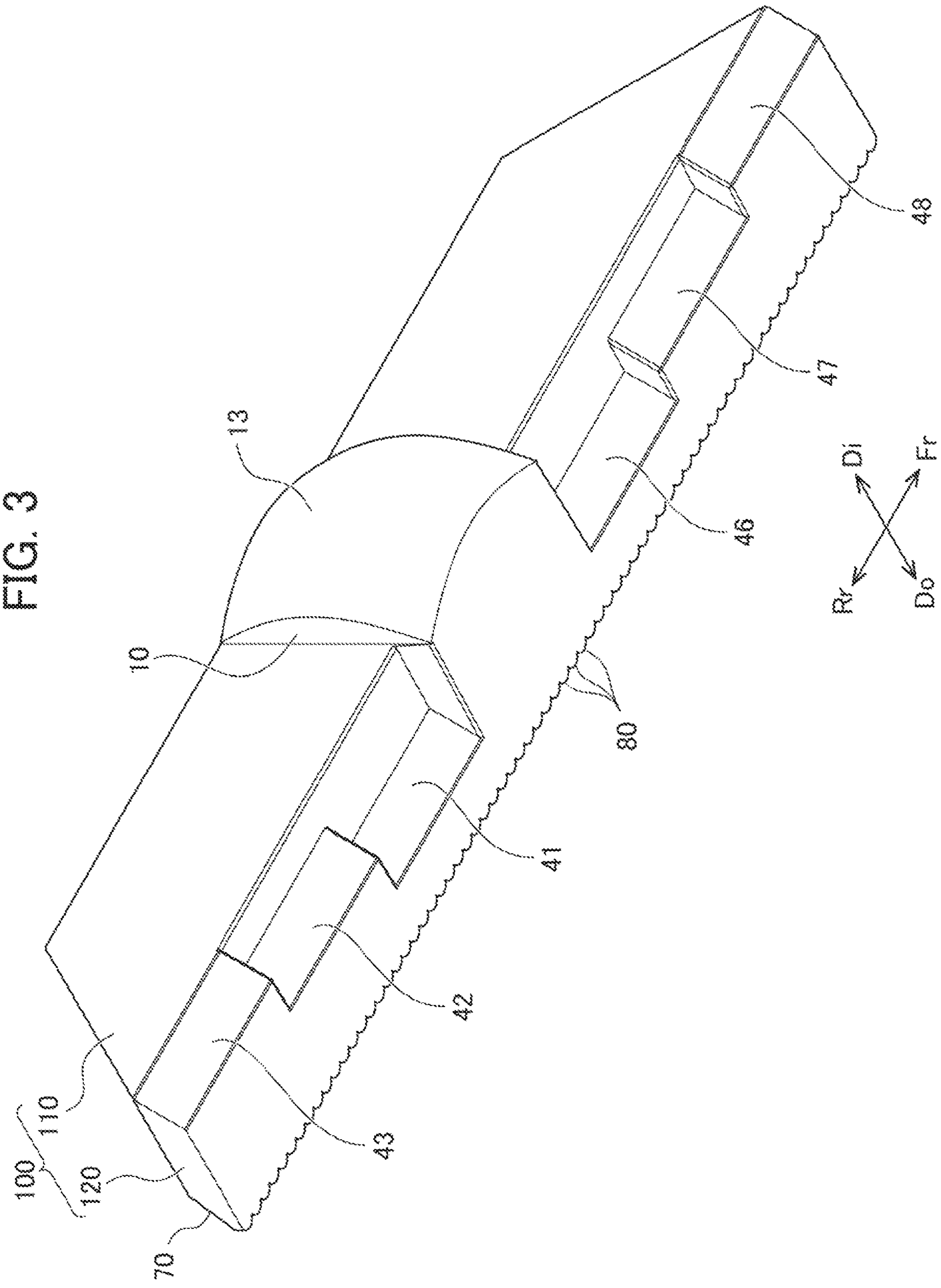
FIG. 3 is a perspective view of the lens structure as viewed from diagonally below on an inner side in the vehicle width direction.
Figure 4:
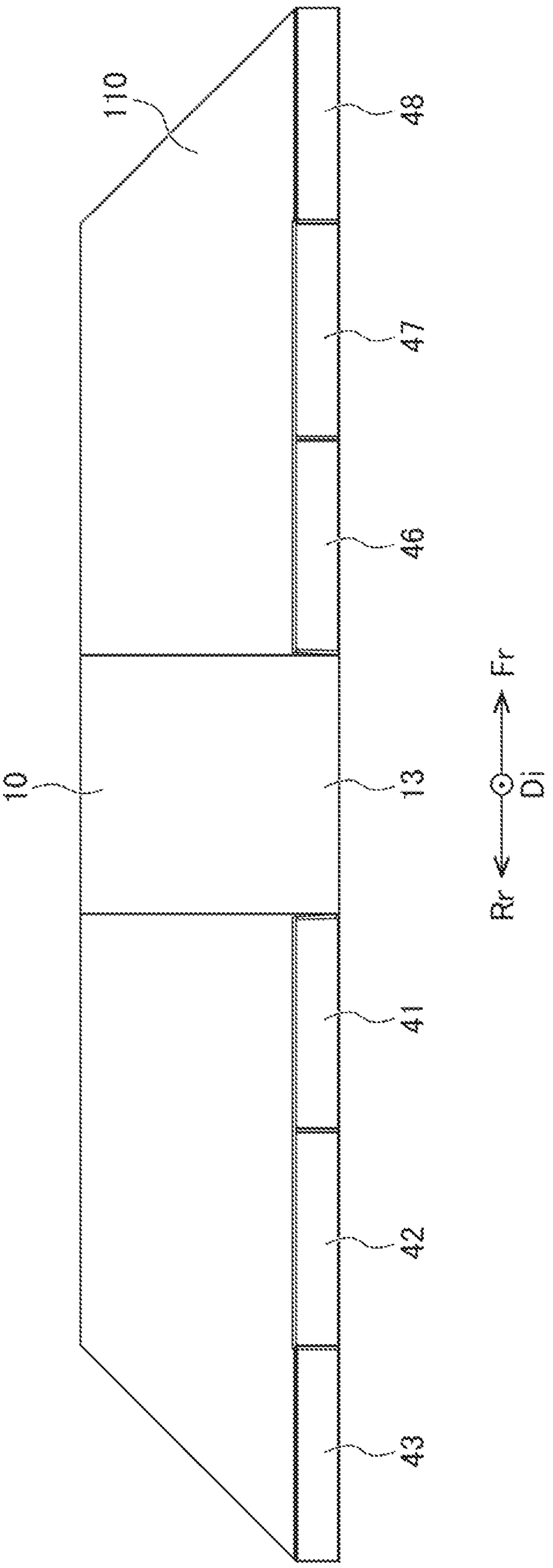
FIG. 4 is a side view of the lens structure as viewed from the inner side in the vehicle width direction.
Figure 5:
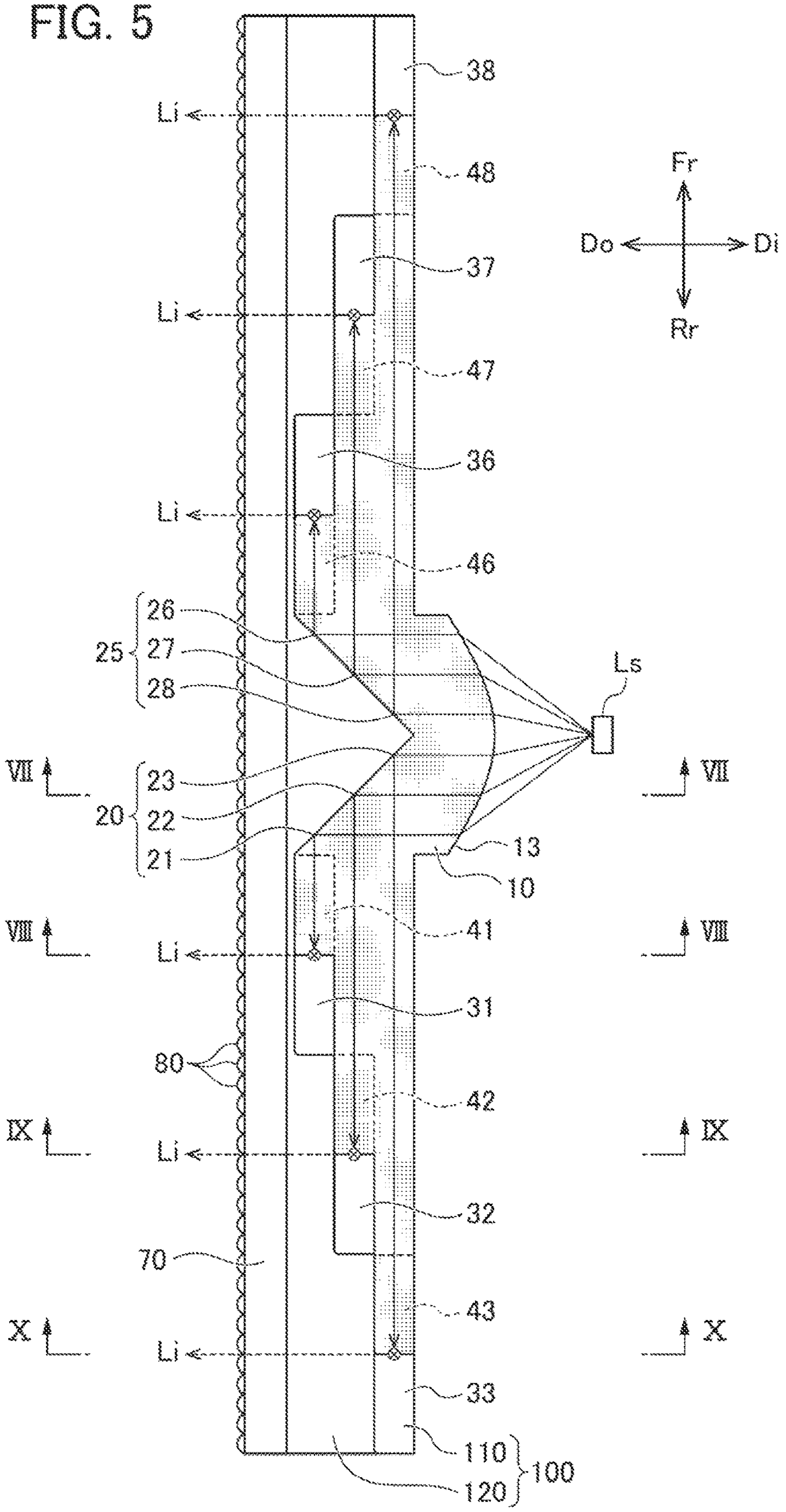
FIG. 5 is a sectional view taken along line V-V in FIG. 2.

First, the light guide 110 will be described. As shown in FIGS. 3, 4, etc., the light guide 110 includes a collimating part 10. The collimating part 10 protrudes inward Di at the central portion in the front and rear direction of the light guide 110, and a curved surface 13 curved in a convex lens shape is formed at an end portion on the inward Di side. As shown in FIG. 5, the curved surface 13 converts diffused light from a light source Ls into parallel light directed outward Do.

Figure 2:
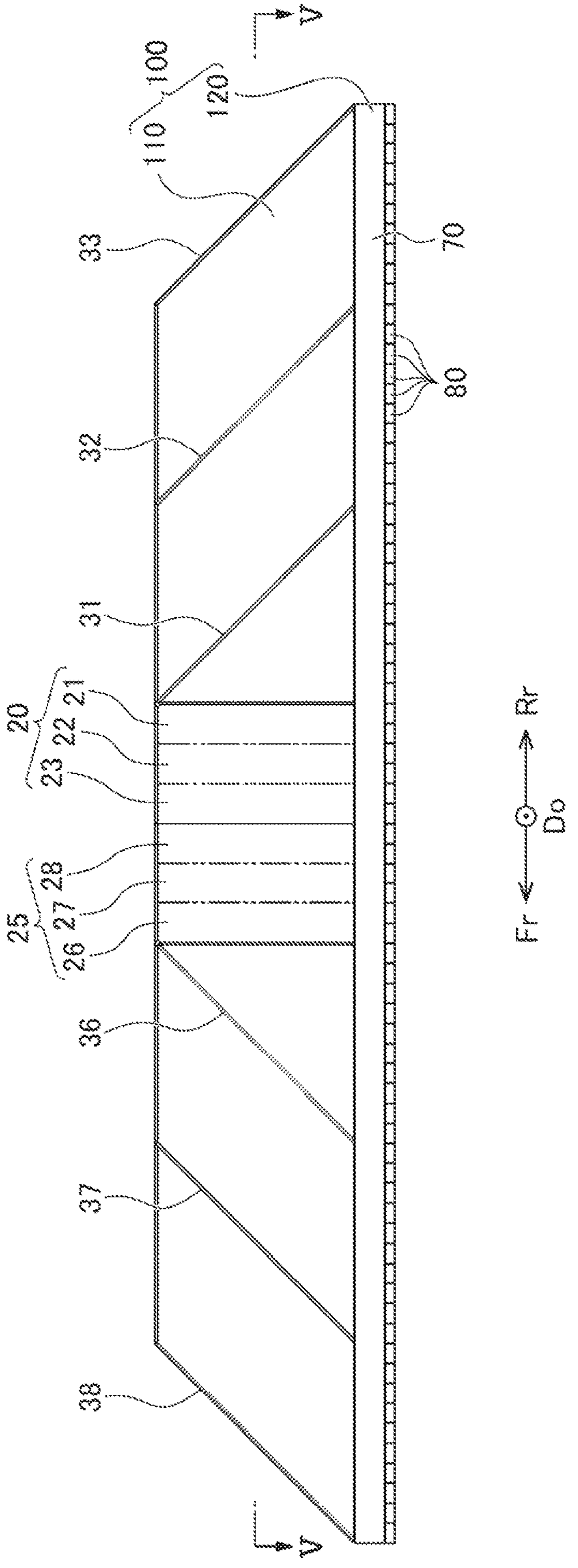
FIG. 2 is a side view of the lens structure as viewed from the outer side in the vehicle width direction.

As shown in FIGS. 1, 2, etc., the light guide 110 further includes a rearward reflective surface 20 and a forward reflective surface 25. As shown in FIG. 5, etc., the rearward reflective surface 20 and the forward reflective surface 25 are provided at positions outward Do of the curved surface 13. The rearward reflective surface 20 and the forward reflective surface 25 are arranged side by side in the vehicle length direction Fr, Rr, and the rearward reflective surface 20 is positioned further rearward Rr than the forward reflective surface 25. A direction perpendicular to the rearward reflective surface 20 is inclined at 45° rearward Rr from the inward Di direction, and totally reflects light Li from the collimating part 10 rearward Rr. A direction perpendicular to the forward reflective surface 25 is inclined at 45° forward Fr from the inward Di direction, and totally reflects light Li from the collimating part 10 forward Fr.

Hereinafter, as shown in FIGS. 1, 2, etc., the rearmost portion of the rearward reflective surface 20 divided into three equal parts in the vehicle length direction Fr, Rr is referred to as a "rearward reflective surface first part 21", the middle portion thereof is referred to as a "rearward reflective surface second part 22", and the frontmost portion thereof is referred to as a "rearward reflective surface third part 23". Hereinafter, the frontmost portion of the forward reflective surface 25 divided into three equal parts in the vehicle length direction Fr, Rr is referred to as a "forward reflective surface first part 26", the middle portion thereof is referred to as a "forward reflective surface second part 27", and the rearmost portion thereof is referred to as a "forward reflective surface third part 28". In FIG. 2, etc., for the sake of visibility, two-dot chain lines are respectively shown between the rearward reflective surface first part 21 and the rearward reflective surface second part 22, and between the rearward reflective surface second part 22 and the rearward reflective surface third part 23, but the rearward reflective surface 20 is a single flush surface. This also applies to the forward reflective surface 25.

As shown in FIGS. 1, 2, etc., the light guide 110 further includes six downward reflective surfaces 31, 32, 33, 36, 37, and 38. The six downward reflective surfaces 31, 32, 33, 36, 37, and 38 include three rear-side downward reflective surfaces 31, 32, and 33, and three front-side downward reflective surfaces 36, 37, and 38. The three rear-side downward reflective surfaces 31, 32, and 33 include a rear-side first downward reflective surface 31, a rear-side second downward reflective surface 32, and a rear-side third downward reflective surface 33. The three front-side downward reflective surfaces 36, 37, and 38 include a front-side first downward reflective surface 36, a front-side second downward reflective surface 37, and a front-side third downward reflective surface 38.

A direction perpendicular to each of the three rear-side downward reflective surfaces 31, 32, and 33 is inclined at 45° downward from the forward Fr direction, and reflects light from the rearward reflective surface 20 downward as shown in FIG. 5, etc. Specifically, the rear-side first downward reflective surface 31 is provided at a position rearward Rr of the rearward reflective surface first part 21, and reflects light from the rearward reflective surface first part 21 downward. The rear-side second downward reflective surface 32 is provided at a position more rearward Rr of the rearward reflective surface second part 22 than the rear-side first downward reflective surface 31, and reflects light from the rearward reflective surface second part 22 downward. The rear-side third downward reflective surface 33 is provided at a position more rearward Rr of the rearward reflective surface third part 23 than the rear-side second downward reflective surface 32, and reflects light from the rearward reflective surface third part 23 downward.

The description of the three front-side downward reflective surfaces 36, 37, and 38 is the same as the description of the three rear-side downward reflective surfaces 31, 32, and 33 described above, except that the "rear" is replaced with "front", the "rearward" is replaced with "forward", and the reference numerals are replaced with the corresponding reference numerals.

As shown in FIGS. 3, 4, etc., the light guide 110 further includes six outward reflective surfaces 41, 42, 43, 46, 47, and 48 at a lower end portion. The six outward reflective surfaces 41, 42, 43, 46, 47, and 48 include a rear-side first outward reflective surface 41, a rear-side second outward reflective surface 42, a rear-side third outward reflective surface 43, a front-side first outward reflective surface 46, a front-side second outward reflective surface 47, and a front-side third outward reflective surface 48.

Figure 8:
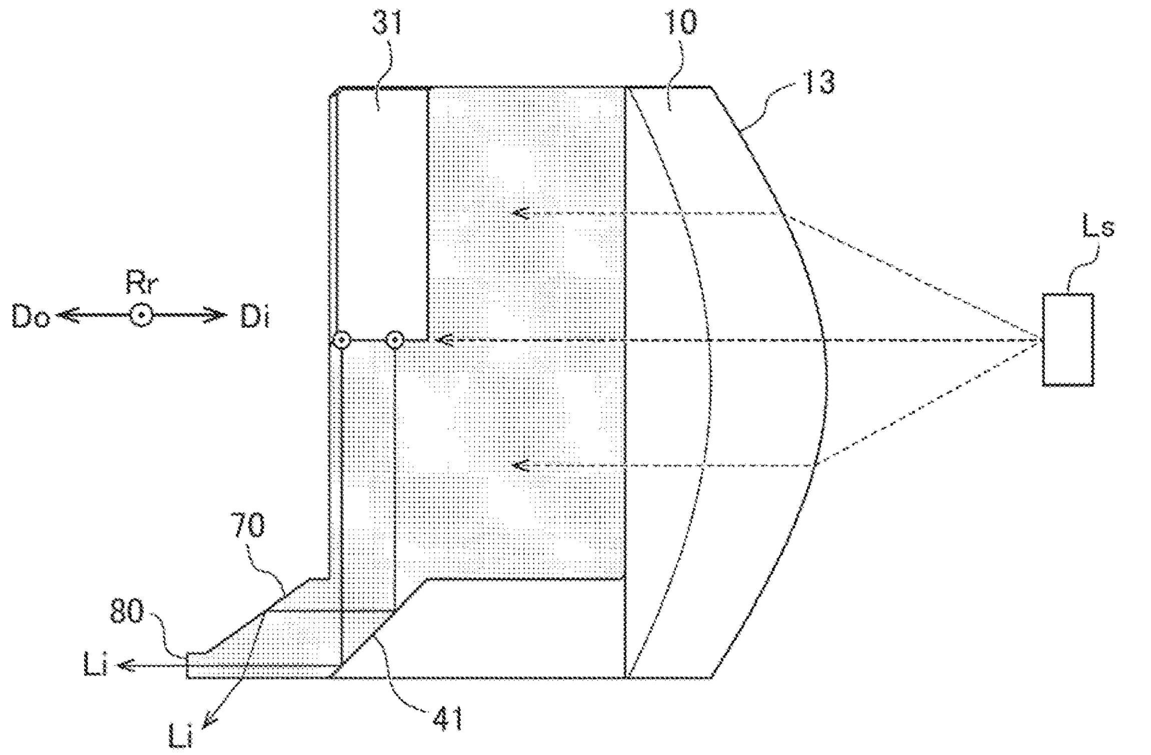
FIG. 8 is a sectional view taken along line VIII-VIII in FIG. 5.
Figure 9:
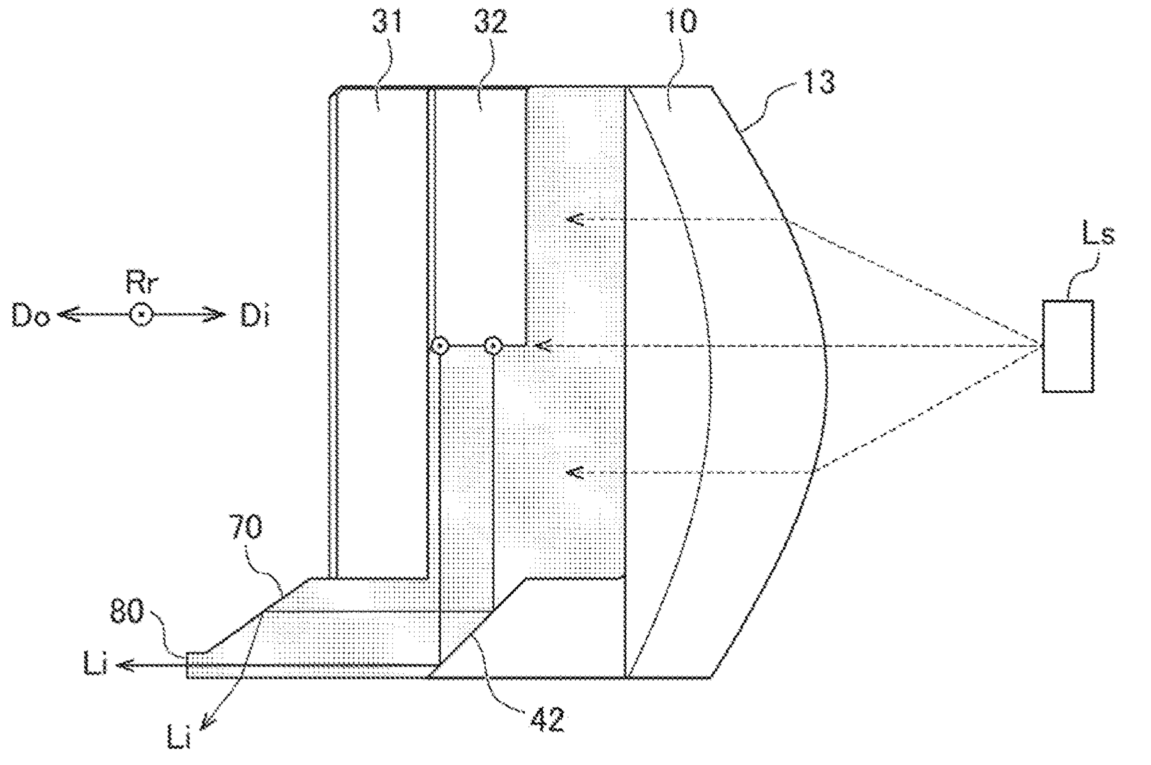
FIG. 9 is a sectional view taken along line IX-IX in FIG. 5.
Figure 10:
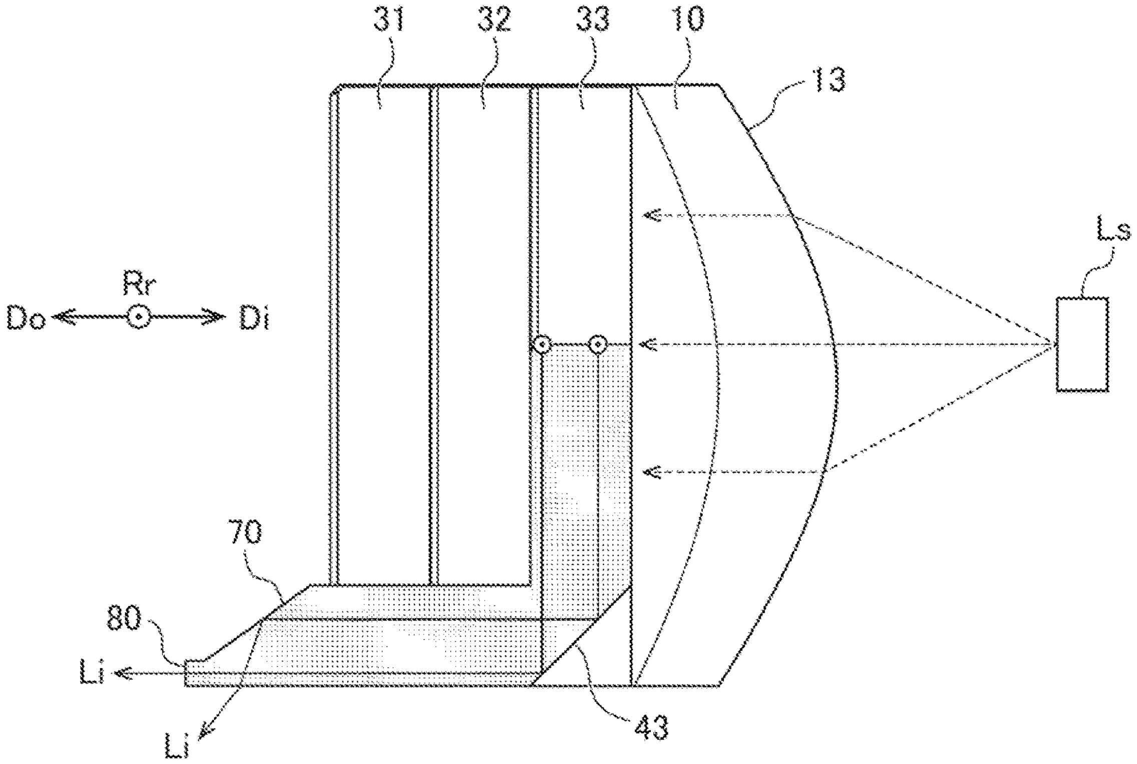
FIG. 10 is a sectional view taken along line X-X in FIG. 5.

A direction perpendicular to each of the six outward reflective surfaces 41, 42, 43, 46, 47, and 48 is inclined at 45° outward Do from an upper direction, and totally reflects light Li from the downward reflective surfaces 31, 32, 33, 36, 37, and 38 corresponding thereto outward Do. Specifically, as shown in FIG. 8, the rear-side first outward reflective surface 41 is provided at a position downward of the rear-side first downward reflective surface 31, and reflects light Li from the rear-side first downward reflective surface 31 outward Do. As shown in FIG. 9, the rear-side second outward reflective surface 42 is provided at a position downward of the rear-side second downward reflective surface 32, and reflects light Li from the rear-side second downward reflective surface 32 outward Do. As shown in FIG. 10, the rear-side third outward reflective surface 43 is provided at a position downward of the rear-side third downward reflective surface 33, and reflects light Li from the rear-side third downward reflective surface 33 outward Do.

The description of the three front-side outward reflective surfaces 46, 47, and 48 is the same as the description of the three rear-side outward reflective surfaces 41, 42, and 43 described above, except that the "rear" is replaced with "front", the reference numerals are replaced with the corresponding reference numerals, and references to FIGS. 8 to 10 are omitted.

With the above configuration, as shown in FIG. 5, etc., after totally reflecting the light from the light source Ls a plurality of times, the light guide 110 guides the light to the light transmitter 120 as parallel light directed outward Do.

Next, the light transmitter 120 will be described. As shown in FIG. 1, etc., the light transmitter 120 has a reflective surface 70 for road surface illumination on an upper portion of an outward Do-side end portion.

Figure 6:
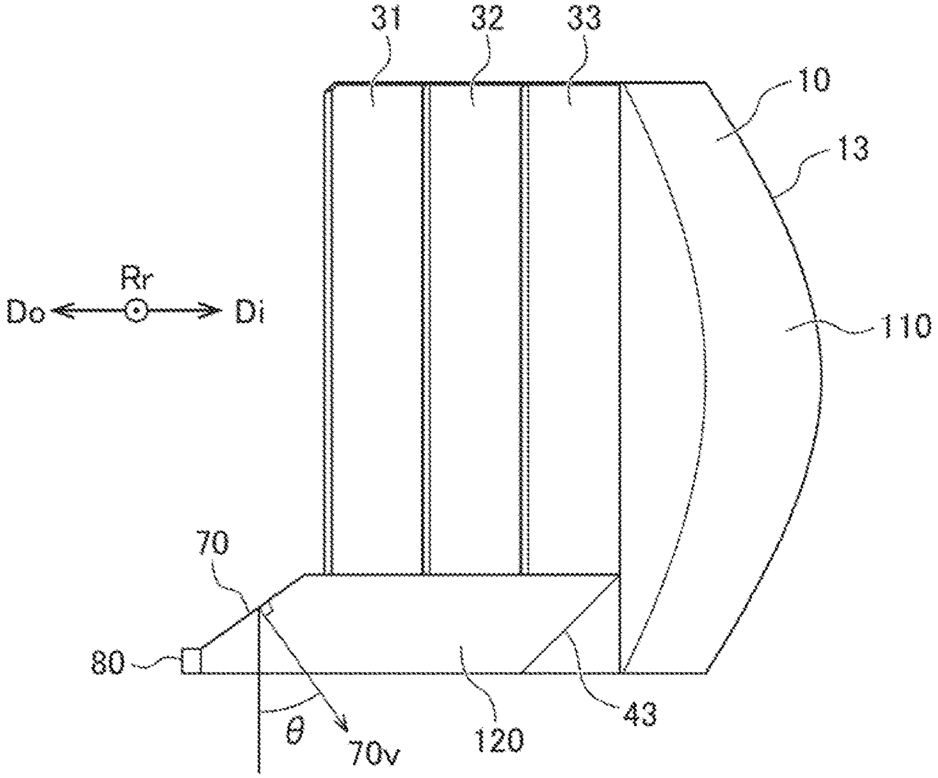
FIG. 6 is a rear view of the lens structure.
Figure 7:
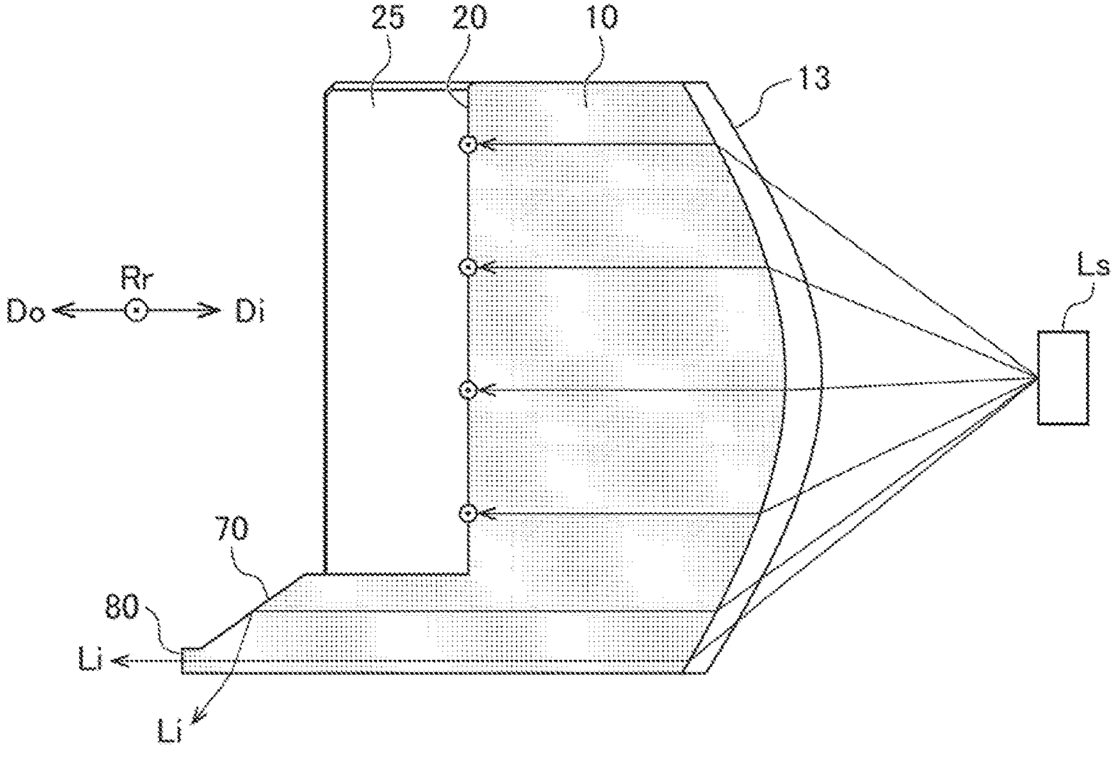
FIG. 7 is a sectional view taken along line VII-VII in FIG. 5.

Specifically, the reflective surface 70 for road surface illumination is provided at a position outward Do of the area including the six outward reflective surfaces 41, 42, 43, 46, 47, and 48, and extends in the vehicle length direction Fr, Rr. As shown in FIG. 6, a direction 70*v* perpendicular to the reflective surface 70 for road surface illumination is inclined at an angle θ of less than 45° inward Di from a downward direction. As shown in FIGS. 7 to 10, the reflective surface 70 for road surface illumination reflects light from a lower portion of the collimating part 10 and light from the six outward reflective surfaces 41, 42, 43, 46, 47, and 48 downward and outward. The light illuminates the road surface as shown in FIG. 11.

On the other hand, as shown in FIGS. 7 to 10, the light transmitted below the reflective surface 70 for road surface illumination in the light transmitter 120 radiates outward Do. Specifically, a plurality of convex lens-shaped optical cut parts 80 for diffusing parallel light are arranged side by side in the vehicle length direction Fr, Rr at a lower portion of the outward Do-side end portion of the light transmitter 120, and the light diffused by the optical cut parts 80 radiates outward Do.

The effects of the present embodiment are summarized below.

As shown in FIGS. 7 to 10, etc., the reflective surface 70 for road surface illumination for totally reflecting the light travelling outward Do downward is provided at the upper portion of the outward Do-side end portion in the light transmitter 120. The light Li transmitted from below the reflective surface 70 in the light transmitter 120 in the outward Do direction radiates outward Do, and the light Li reflected by the reflective surface 70 illuminates the road surface. Thus, a part of the parallel light passing through the light transmitter 120 radiates outward Do, and the other part thereof can illuminate the road surface. Therefore, the light from one or one group of light sources Ls can be used for two applications, i.e., outward radiation and road surface illumination. In addition, by collectively providing the part for outward radiation and the part for road surface illumination at the end portion of the light transmitter 120, a lens structure excellent in design and vehicle mountability can be provided.

As shown in FIGS. 7 to 10, etc., the light guide 110 and the light transmitter 120 are integrally formed. Thus, there is no concern about reflection or the like occurring between the light guide 110 and the light transmitter 120. Therefore, the parallel light can be smoothly guided from the light guide 110 to the light transmitter 120.

As shown in FIG. 6, the direction 70*v* perpendicular to the reflective surface 70 for road surface illumination is inclined at an angle θ of less than 45° inward Di from a directly downward direction. Thus, as shown in FIGS. 7 to 10, etc., the parallel light travelling outward Do is not reflected directly downward by the reflective surface 70, but can be reflected toward the outward Do side rather than in the directly downward direction. Therefore, as shown in FIG. 11, the reflected light can directly illuminate a position on the road surface separated from the own vehicle 800 outward Do.

Second Embodiment

Next, a second embodiment will be described. In the following embodiments, points different from those of the first embodiment will be mainly described, and description of the same or similar points as those of the first embodiment will be omitted as appropriate.

Figure 12:
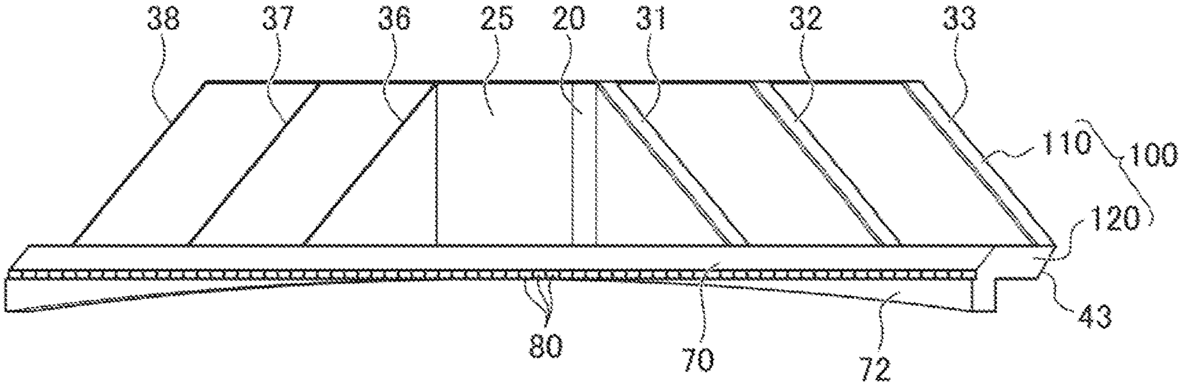
FIG. 12 is a perspective view of a lens structure according to a second embodiment.

As shown in FIG. 12, a second optical cut part 72 having a concave lens shape for diffusing the light Li for road surface illumination so as to spread in the vehicle length direction Fr, Rr is provided at the lower end portion of the outward Do-side end portion of the light transmitter 120.

Figure 13:
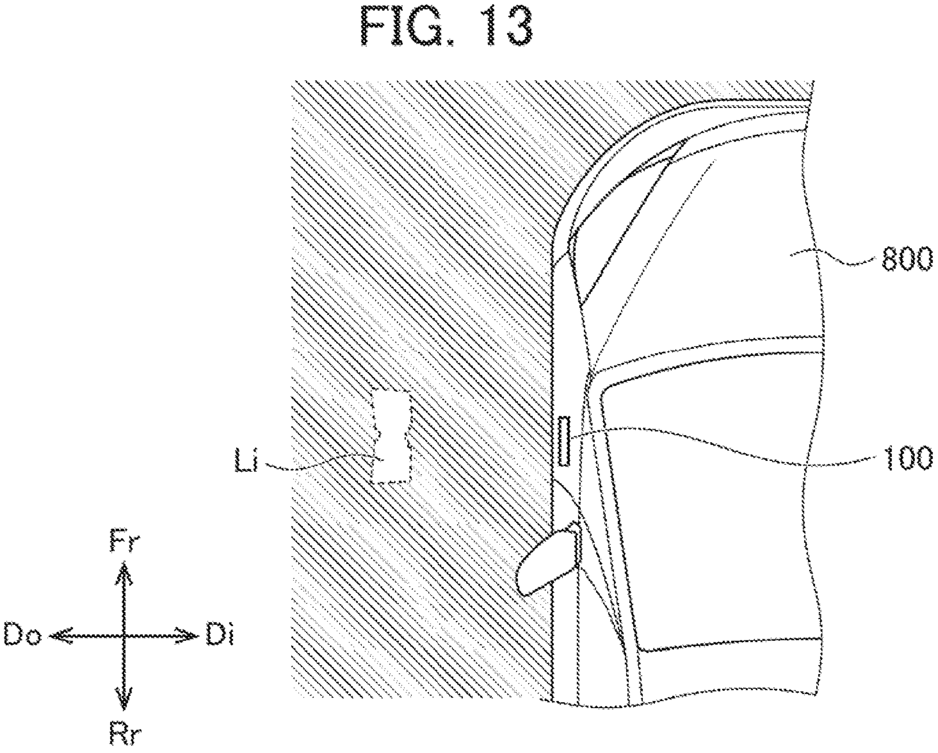
FIG. 13 is a plan view of an own vehicle and the lens structure as viewed from above.

According to the present embodiment, as shown in FIG. 13, the area of the light Li drawn on the road surface can be elongated in the vehicle length direction Fr, Rr.

Third Embodiment

Figure 14:
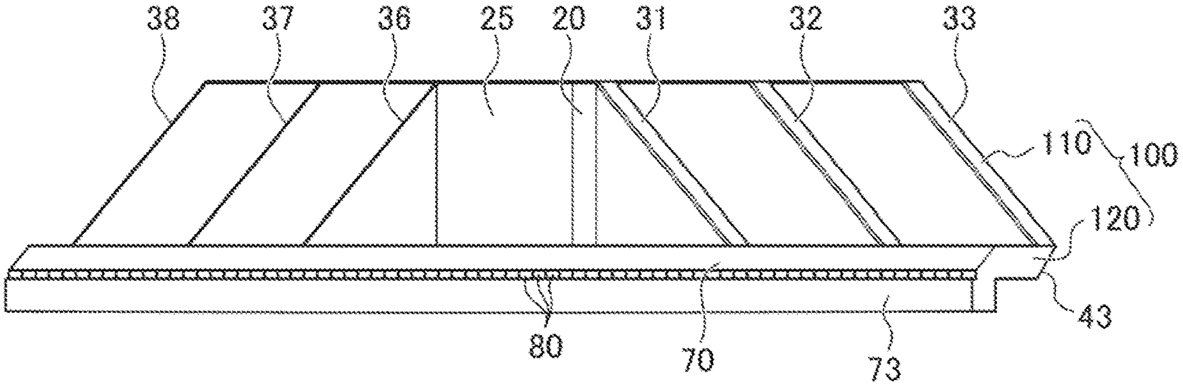
FIG. 14 is a perspective view of a lens structure according to a third embodiment as viewed from diagonally above.

Next, a third embodiment will be described. As shown in FIG. 14, a third optical cut part 73 for diffusing the light Li for road surface illumination so as to spread in the vehicle width direction Di, Do is provided at the lower end portion of the outward Do-side end portion of the light transmitter 120.

Figure 15:
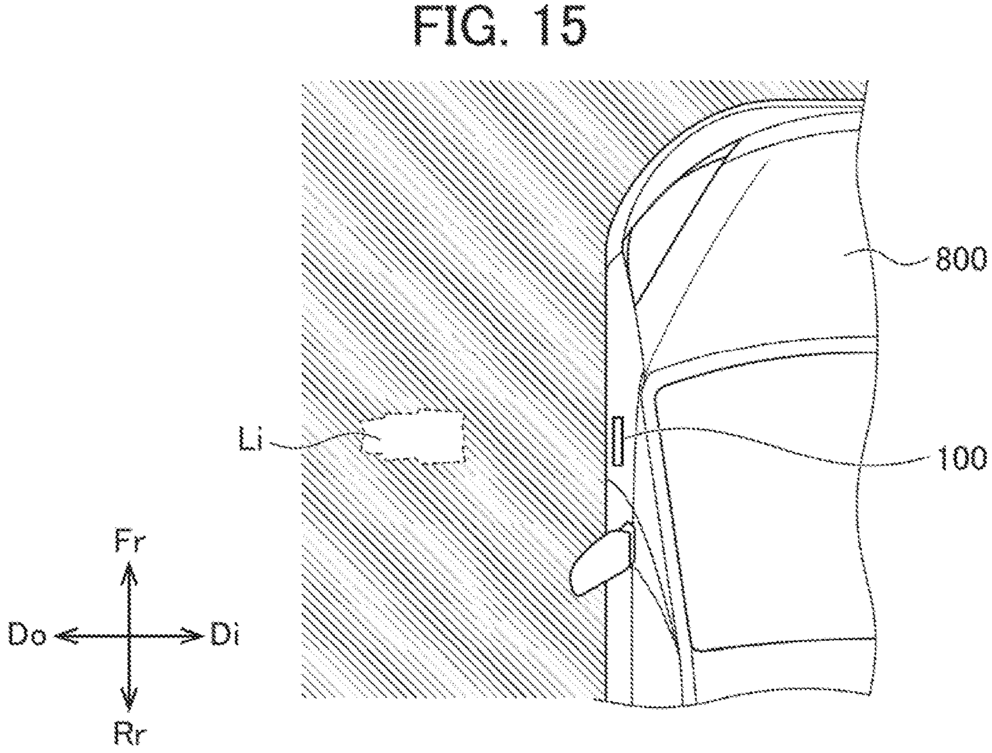
FIG. 15 is a plan view of an own vehicle and the lens structure as viewed from above.

According to the present embodiment, as shown in FIG. 15, the area of the light Li drawn on the road surface can be elongated in the vehicle width direction Di, Do.

Fourth Embodiment

Figure 16:
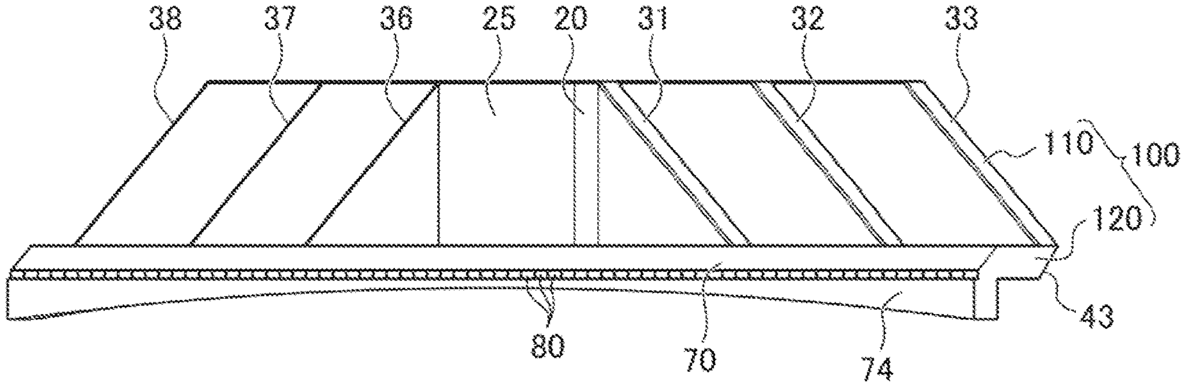
FIG. 16 is a perspective view of a lens structure according to a fourth embodiment as viewed from diagonally above.

Next, a fourth embodiment will be described. As shown in FIG. 16, a fourth optical cut part 74 for diffusing the light Li for road surface illumination in a mark shape such as a horseshoe shape is provided at the lower end portion of the outward Do-side end portion of the light transmitter 120.

Figure 17:
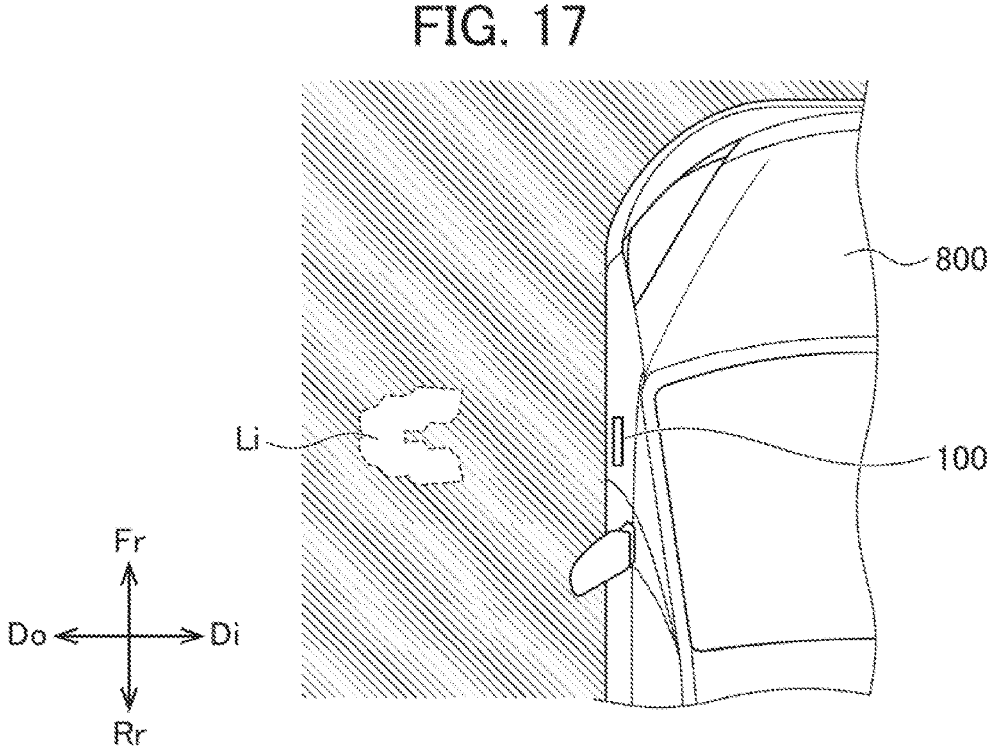
FIG. 17 is a plan view of an own vehicle and the lens structure as viewed from above.

According to the present embodiment, as shown in FIG. 17, the area of the light Li drawn on the road surface can form the shape of the mark.

Other Embodiments

Figure 18:
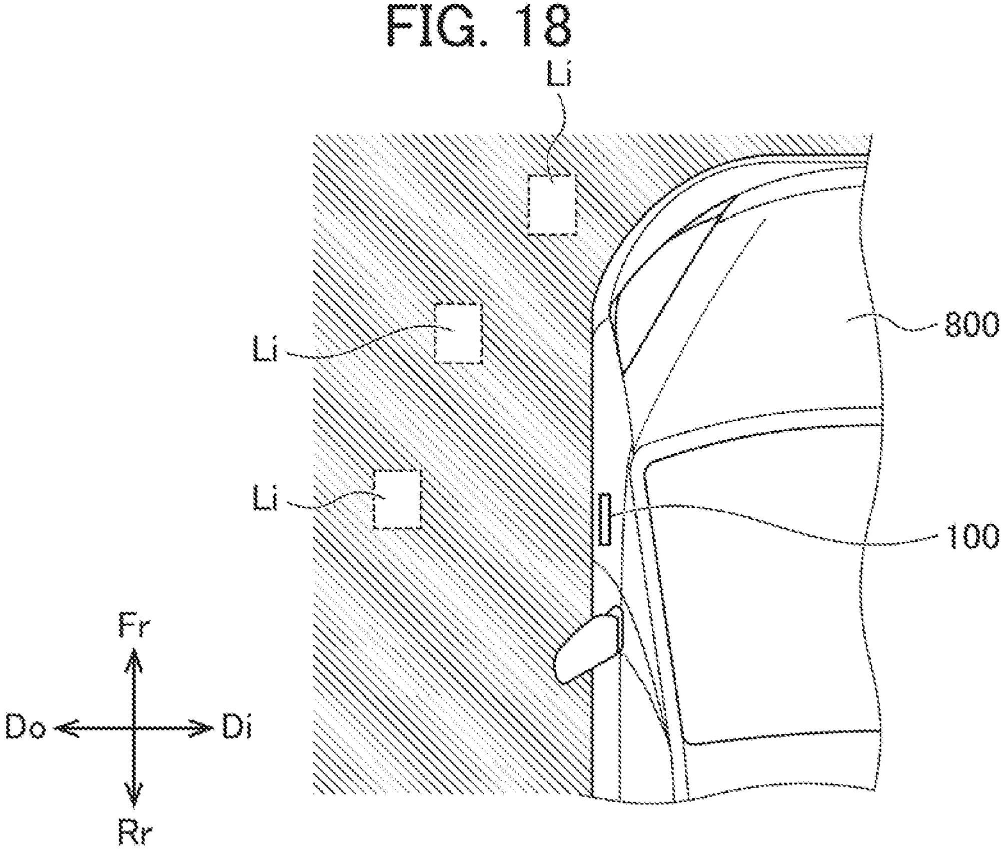
FIG. 18 is a plan view of an own vehicle and a lens structure as viewed from above in a modification.

The above embodiments can be modified, for example, as follows. As shown in FIG. 18, a plurality of areas of light Li may be drawn on the road surface by one or a plurality of lens structures 100. The lens structure 100 is not limited to facing outward Do, and may be installed facing forward Fr or rearward Rr. The shape of the area of the light Li drawn on the road surface is not limited to the above, and can be freely set.

EXPLANATION OF REFERENCE NUMERALS

70 reflective surface for road surface illumination

70*v* direction perpendicular to reflective surface for road surface illumination

100 lens structure

110 light guide

120 light transmitter

Di inward (direction opposite to predetermined horizontal direction)

Do outward (predetermined horizontal direction)

Ls light source

θ angle of less than 45°

What is claimed is:

1. A lens structure for a vehicle lamp configured to emit light in a predetermined horizontal direction, the lens structure comprising:

a light transmitter configured to transmit the light in the predetermined horizontal direction; and a reflective surface provided at an upper portion of an end portion of the light transmitter in the predetermined horizontal direction and configured to totally reflect the light travelling in the predetermined horizontal direction downward, the end portion transmitting the light in the predetermined horizontal direction toward an outer side of the lens structure, a direction perpendicular to the reflective surface being inclined toward a direction opposite to the predetermined horizontal direction from a direction directly downward, wherein the light transmitted from below the reflective surface in the light transmitter in the predetermined horizontal direction radiates in the predetermined horizontal direction, and wherein the light reflected by the reflective surface illuminates a road surface.

2. The lens structure for a vehicle lamp according to claim 1, wherein the lens structure further comprises a light guide configured to guide light from a light source into the light transmitter as parallel light travelling in the predetermined horizontal direction, and the light guide and the light transmitter are integrally formed.

3. The lens structure for a vehicle lamp according to claim 1, wherein the direction perpendicular to the reflective surface is inclined at an angle of less than 45° toward the direction opposite to the predetermined horizontal direction from the direction directly downward.

* * * * *